United States Patent
Lin et al.

(10) Patent No.: US 11,442,240 B2
(45) Date of Patent: Sep. 13, 2022

(54) LENS MODULE OF IMPROVED STABILITY AND ELECTRONIC DEVICE HAVING THE SAME

(71) Applicant: TRIPLE WIN TECHNOLOGY(SHENZHEN) CO.LTD., Shenzhen (CN)

(72) Inventors: Cheng-An Lin, New Taipei (TW); Yu-Kai Wang, New Taipei (TW); Chun-Yao Huang, New Taipei (TW)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 454 days.

(21) Appl. No.: 16/675,022

(22) Filed: Nov. 5, 2019

(65) Prior Publication Data

US 2021/0033815 A1     Feb. 4, 2021

(30) Foreign Application Priority Data

Jul. 31, 2019   (CN) .......................... 201910703522.0

(51) Int. Cl.
| | |
|---|---|
| G02B 7/04 | (2021.01) |
| H04N 5/232 | (2006.01) |
| H04N 5/225 | (2006.01) |
| G03B 13/34 | (2021.01) |
| G03B 3/10 | (2021.01) |
| H02K 41/035 | (2006.01) |

(52) U.S. Cl.
CPC ................ *G02B 7/04* (2013.01); *G03B 3/10* (2013.01); *G03B 13/34* (2013.01); *H04N 5/2253* (2013.01); *H04N 5/23248* (2013.01); *H02K 41/0354* (2013.01)

(58) Field of Classification Search
CPC . G02B 7/022; G02B 7/04; G02B 7/08; G03B 13/34; G03B 17/02; G03B 2205/0069; G03B 3/10; G03B 30/00; H02K 41/0354; H04N 5/2253; H04N 5/2254; H04N 5/23248
See application file for complete search history.

(56) References Cited

U.S. PATENT DOCUMENTS

| | | | | |
|---|---|---|---|---|
| 2004/0207745 | A1* | 10/2004 | Tsuruta | H04N 5/2254 |
| | | | | 348/335 |
| 2010/0195223 | A1* | 8/2010 | Chang | G02B 7/08 |
| | | | | 359/824 |
| 2015/0215542 | A1 | 7/2015 | Nomura et al. | |
| 2018/0302538 | A1* | 10/2018 | Chen | H04N 5/2253 |

FOREIGN PATENT DOCUMENTS

CN          205792913 U      12/2016

* cited by examiner

*Primary Examiner* — Thomas K Pham
*Assistant Examiner* — Vipin Patel
(74) *Attorney, Agent, or Firm* — ScienBiziP, P.C.

(57) ABSTRACT

A lens module of enhanced stability and strength when mounted to an image-capturing device includes a voice coil motor. The voice coil motor includes a casing and a first connection plate connected to the casing. The first connection plate defines at least one first mounting hole. An electronic device using the lens module is also provided.

16 Claims, 6 Drawing Sheets

LENS MODULE OF IMPROVED STABILITY AND ELECTRONIC DEVICE HAVING THE SAME

FIELD

The subject matter relates to imaging devices, and more particularly, to a lens module and an electronic device having the lens module.

BACKGROUND

Portable electronic devices, such as cell phones, tablet computers, and multimedia players, usually include lens modules. The lens module may be mounted to the housing of the portable electrode device through adhesive. However, the bonding strength between the lens module and the housing may be poor. Thus, the lens module may be separated from the housing under lateral pressure. Therefore, there is room for improvement in the art.

BRIEF DESCRIPTION OF THE DRAWINGS

Implementations of the present technology will now be described, by way of embodiment, with reference to the attached figures.

DETAILED DESCRIPTION

Figure 1:
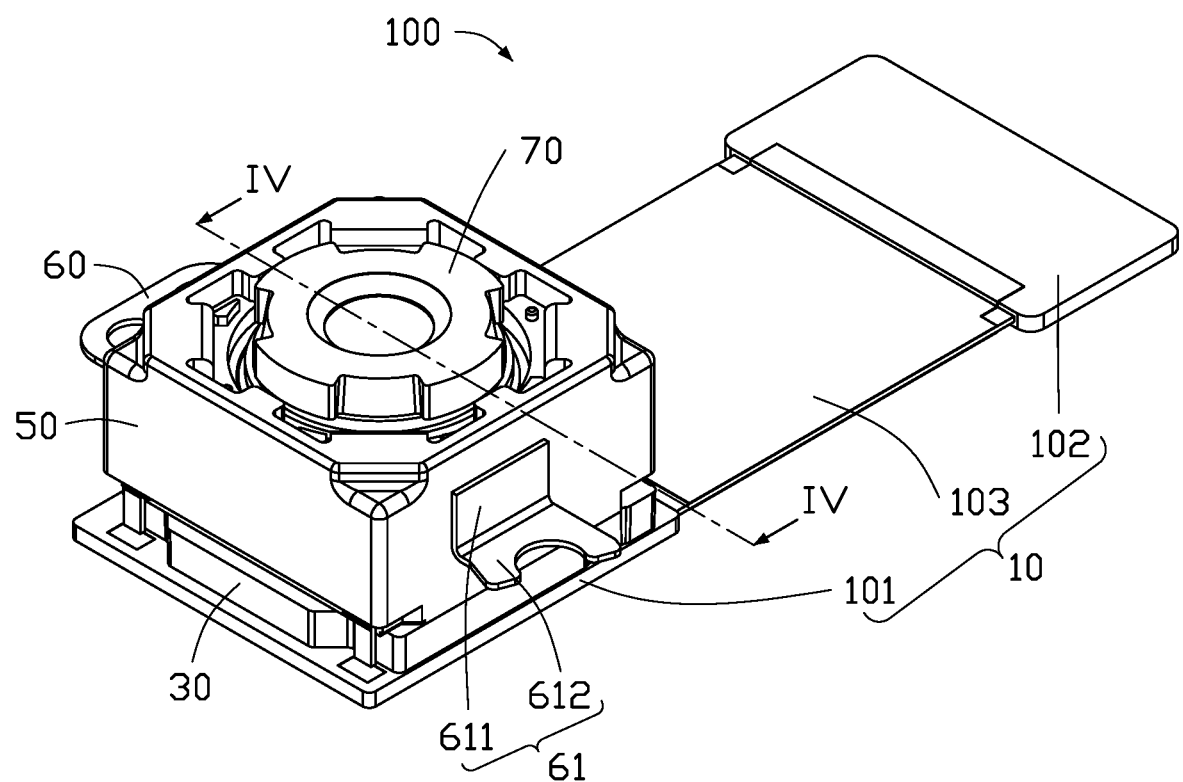
FIG. 1 is a diagrammatic view of an embodiment of a lens module according to the present disclosure.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

FIGS. 1 to 4 illustrates an embodiment of a lens module 100. The lens module 100 can be used in an electronic device, such as a smart phone, a tablet computer, or a personal digital assistant (PDA). The lens module 100 comprises a circuit board 10, an image sensor 20, a mounting bracket 30, an optical filter 40, and a voice coil motor (VCM) 50.

Figure 2:
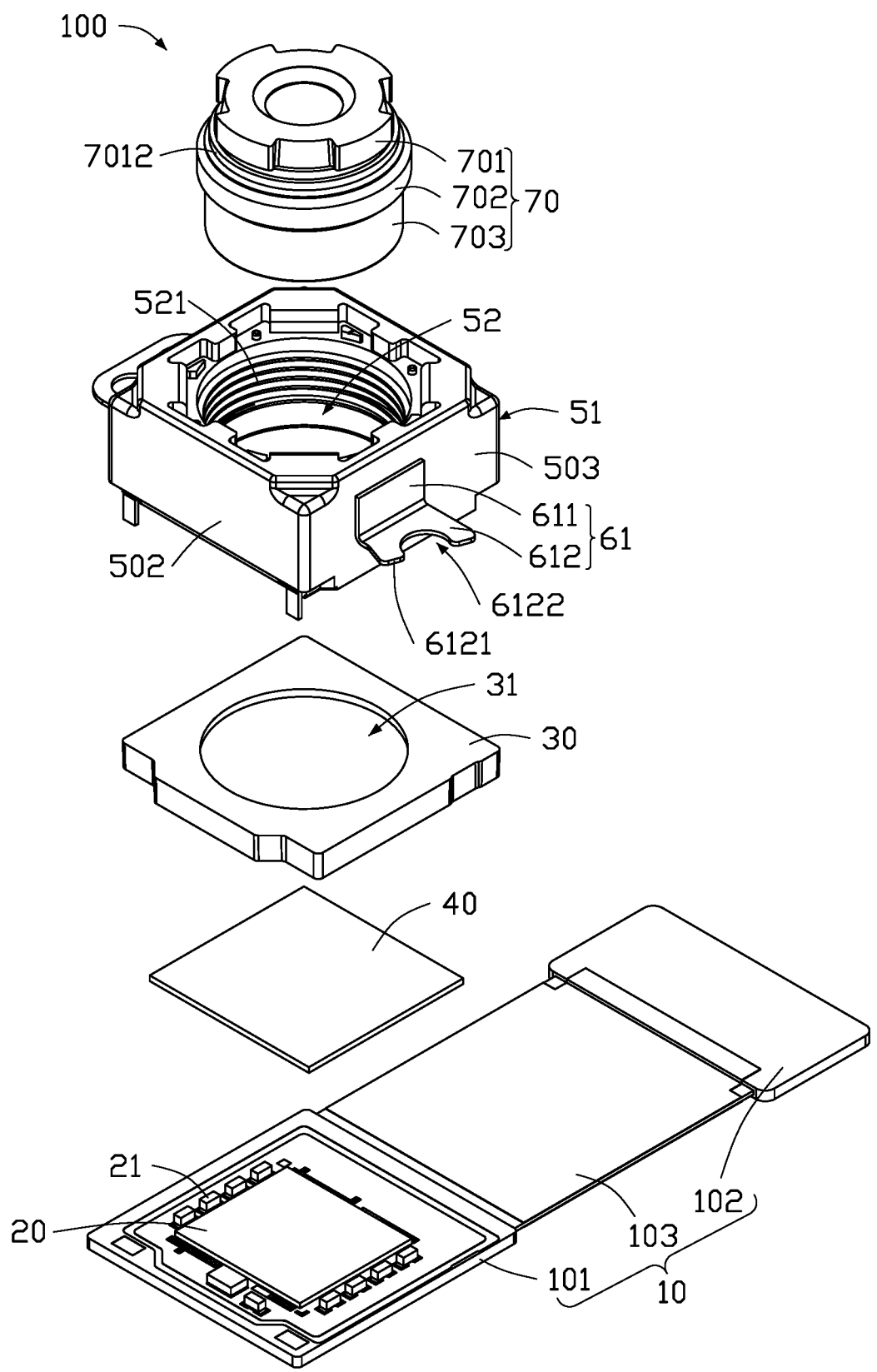
FIG. 2 is an exploded diagram of the lens module of FIG. 1.
Figure 3:
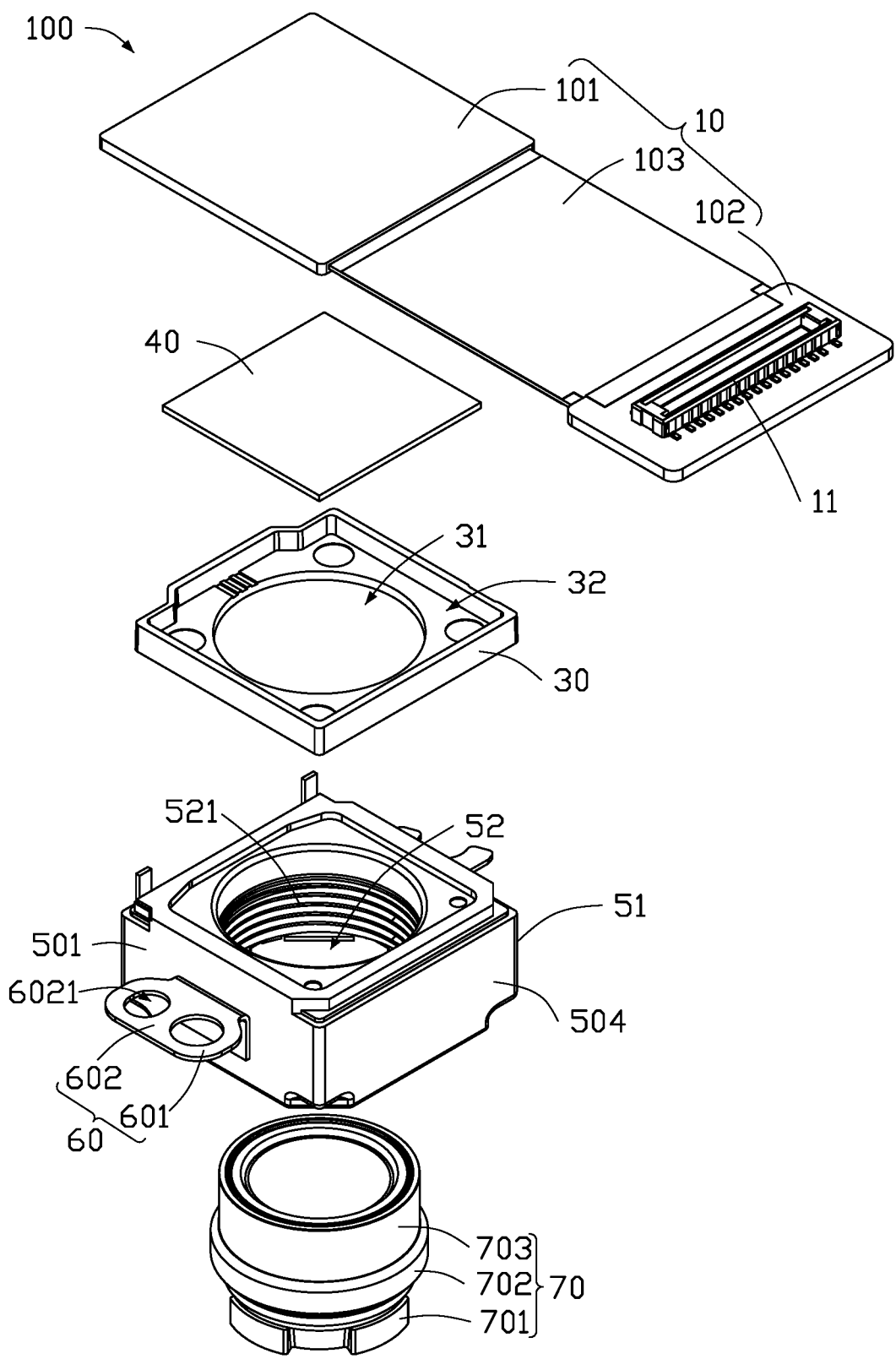
FIG. 3 is an exploded diagram of the lens module of FIG. 1, from another angle.

The circuit board 10 can be a rigid circuit board, a flexible circuit board, or a rigid-flexible circuit board. Referring to FIGS. 2 and 3, in an embodiment, the circuit board 10 is a rigid-flexible circuit board that comprises a first rigid board portion 101, a second rigid board portion 102, and a flexible board portion 103 positioned between the first rigid board portion 101 and the second rigid board portion 102. The second rigid board portion 102 can have an electronic connection member 11 mounted thereon. The electronic connection member 11 can facilitate signal transmission between the lens module 100 and other electronic components (not shown) of the electronic device. The electronic connection member 11 can be gold fingers (edge connector) or other connector.

The image sensor 20 is mounted to a surface of the first rigid board portion 101. The image sensor 20 and the electronic connection member 11 can be positioned at different surfaces of the circuit board 10. In an embodiment, the image sensor 20 can be a Complementary Metal Oxide Semiconductor (CMOS) sensor or a Charge Coupled Device (CCD) sensor. A plurality of electronic components 21 can also be mounted to the surface of the first rigid board portion 101 having the image sensor 20. The electronic components 21 can be resistors, capacitors, diodes, triodes, relays, or electrically erasable programmable read only memories (EEPROMs).

The mounting bracket 30 is connected to the surface of the first rigid board portion 101 having the image sensor 20. The mounting bracket 30 is substantially a hollow cuboid. The mounting bracket 30 defines an aperture 31 passing through the mounting bracket 30. A surface of the mounting bracket 30 facing the circuit board 10 is recessed inwardly to form a receiving groove 32 surrounding the aperture 31. In at least one embodiment, the mounting bracket 30 can be made of a plastic.

The optical filter 40 is received in the receiving groove 32 and faces the image sensor 20. The image sensor 20 is also received in the receiving groove 32.

The VCM 50 is connected to a surface of the mounting bracket 30 facing away from the circuit board 10. The VCM 50 comprises a casing 51 and a first connection plate 60 connected to the casing 51. In at least one embodiment, the VCM 50 includes a first sidewall 501, a second sidewall 502, a third sidewall 503, and a fourth sidewall 504 connected in that order. The first sidewall 501 faces and is parallel to the third sidewall 503. The second sidewall 502 faces and is parallel to the fourth sidewall 504. The first connection plate 60 is connected to the first sidewall 501. The casing 51 defines a receiving hole 52. An inner surface of the receiving hole 52 defines a plurality of first screw threads 521. In at least one embodiment, the casing 51 is made of a metal.

Figure 4:
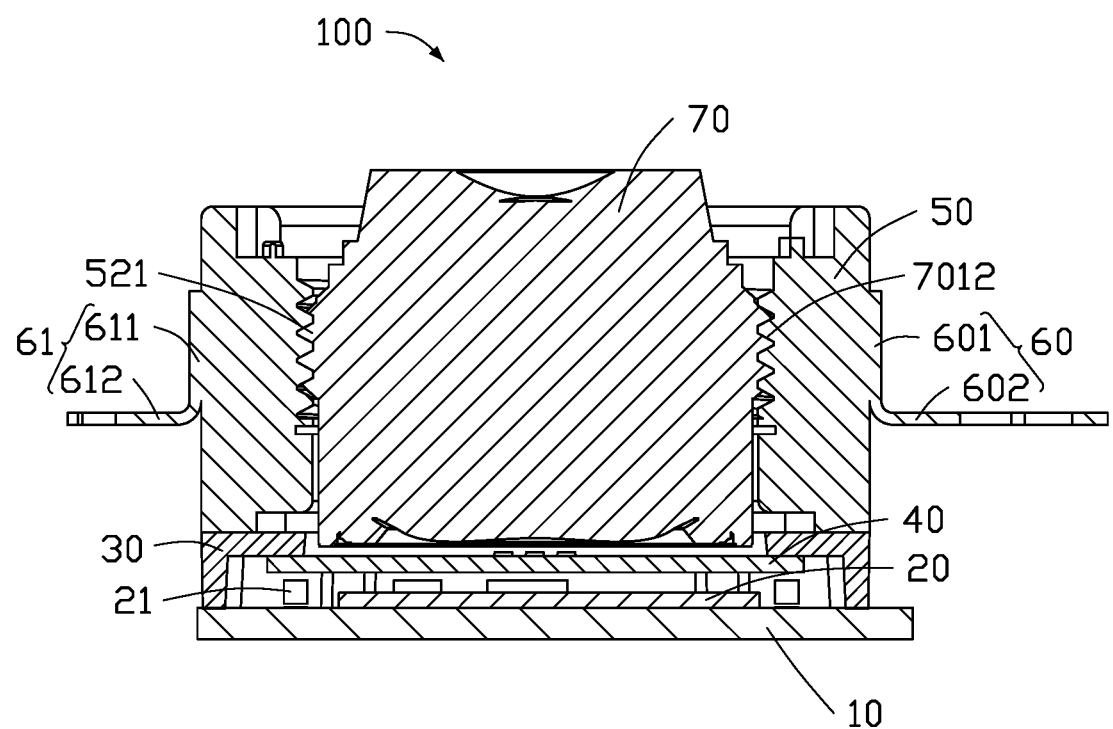
FIG. 4 is a cross-sectional view taken along line IV-IV of FIG. 1.
Figure 5:
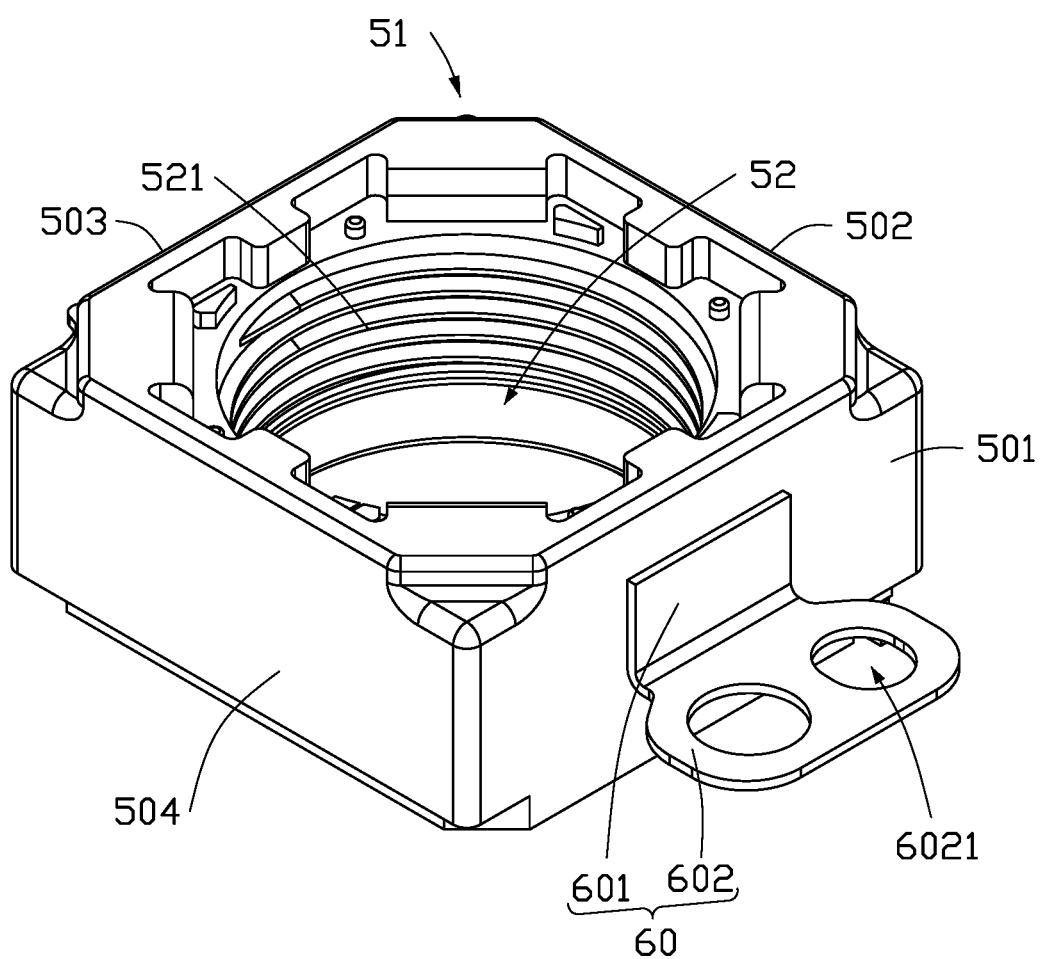
FIG. 5 is a diagrammatic view of a casing and a first connection plate of the lens module of FIG. 1.

Referring to FIGS. 4 and 5, the first connection plate 60 comprises a first connection portion 601 and a second connection portion 602 connected to the first connection portion 601. The first connection portion 601 is attached to the first sidewall 501. The second connection portion 602 and the first connection portion 601 form a preset angle therebetween. In at least one embodiment, the second connection portion 602 is perpendicular to the first connection portion 601 (that is, the preset angle is about 90 degrees). The second connection portion 602 defines at least one first mounting hole 6021. The first mounting hole 6021 facilitates the mounting of the casing 51 to the electronic device. For example, the first mounting hole 6021 can be a screw hole.

A screw bolt can be inserted into the first mounting hole 6021 and the housing of the electronic device, thereby mounting the lens module 100 to the housing of the electronic device. Thus, the bonding strength between the lens module 100 and the housing is increased. In at least one embodiment, the second connection portion 602 defines two first mounting holes 6021. The two first mounting holes 6021 can have a same diameter or different diameters. The second connection portion 602 can be integrally formed with the first connection portion 601.

The VCM 50 can further comprise a second connection plate 61 connected to the casing 51. The second connection plate 61 can be opposite to the first connection plate 60. That is, the second connection plate 61 can be connected to the third sidewall 503. The second connection plate 61 comprises a third connection portion 611 and a fourth connection portion 612 connected to the third connection portion 611. The third connection portion 611 is attached to the third sidewall 503. The fourth connection portion 612 and the third connection portion 611 form a preset angle therebetween. In at least one embodiment, the fourth connection portion 612 is perpendicular to the third connection portion 611 (that is, the preset angle is about 90 degrees). The fourth connection portion 612 comprises an edge 6121 facing away from the third sidewall 503. The fourth connection portion 612 defines a second mounting hole 6122 at the edge 6121. The second mounting hole 6122 facilitates the mounting of the casing 51 to the electronic device. For example, the second mounting hole 6122 can be a screw hole. A screw bolt can be inserted into the second mounting hole 6122 and the housing of the electronic device, thereby mounting the lens module 100 to the housing of the electronic device. Thus, the bonding strength between the lens module 100 and the housing is further increased. The fourth connection portion 612 can be integrally formed with the third connection portion 611.

The VCM 50 further comprises a lens 70 received in the receiving hole 52 of the casing 51. The lens 70 comprises a first lens portion 701, a second lens portion 702, and a third lens portion 703. The second lens portion 702 is connected between the first lens portion 701 and the third lens portion 703. A connection area of the first lens portion 701 and the second lens portion 702 defines a plurality of second screw threads 7012. The second screw threads 7012 can engage with the first screw threads 521 to fix the lens 70 in the receiving hole 52. In at least one embodiment, the first lens portion 701, the second lens portion 702, and the third lens portion 703 can be integrally formed, and can also be separate components needing to be assembled. The first lens portion 701 is totally received in the receiving hole 52. The second lens portion 702 is partially received in the receiving hole 52. The third lens portion 703 protrudes from the receiving hole 52. The VCM 50 can adjust the position of the lens 70 to achieve autofocus function of the lens module 100.

Figure 6:
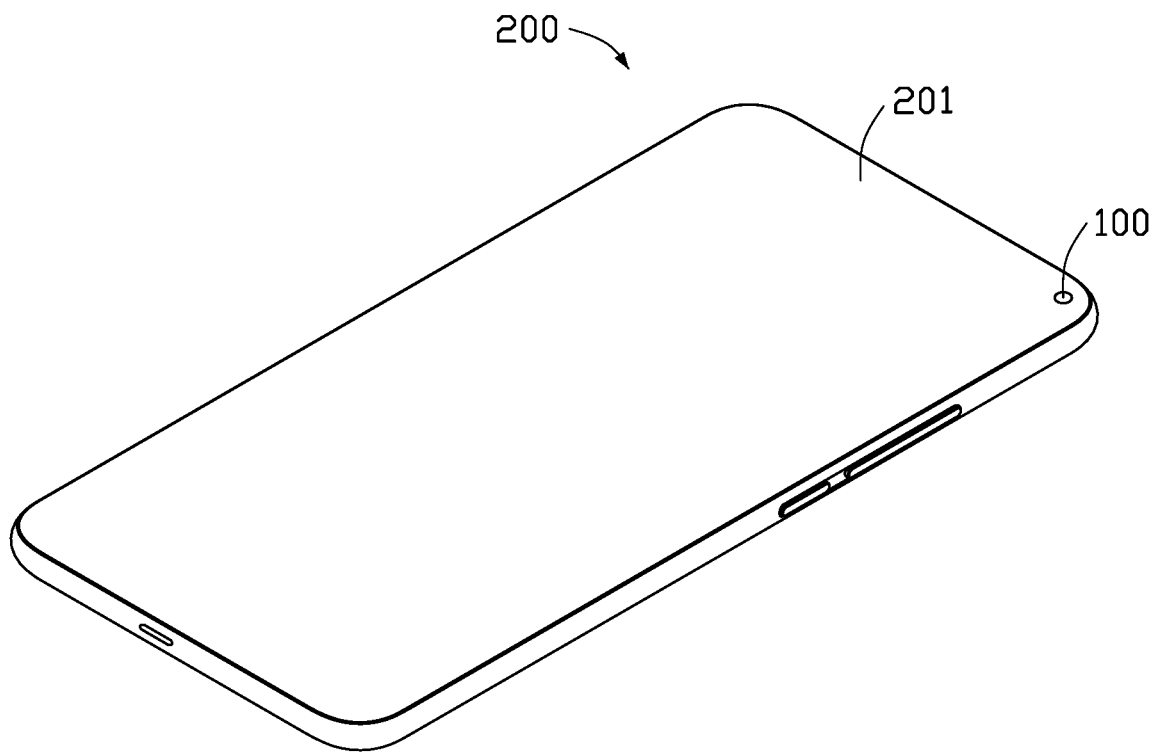
FIG. 6 is a diagrammatic view of an embodiment of an electronic device according to the present disclosure.

FIG. 6 illustrates an embodiment of an electronic device 200. The electronic device 200 comprises a housing 201 and the lens module 100 mounted to the housing 201 through the first connection plate 60 and the second connection plate 61.

When lateral pressure is applied to the lens module 100, separation of the lens module 100 and the housing 201 is rendered less likely.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. A lens module comprising:
    a voice coil motor comprising a casing and a first connection plate connected to the casing, the first connection plate defining at least one first mounting hole;
    a circuit board;
    a mounting bracket mounted on a surface of the circuit board, wherein the casing is mounted on a surface of the mounting bracket, the mounting bracket defines an aperture passing through the mounting bracket, a surface of the mounting bracket facing the circuit board is recessed inwardly to form a receiving groove surrounding the aperture;
    an optical filter received in the receiving groove; and
    an image sensor mounted on the surface of the circuit board having the mounting bracket, wherein the optical filter faces the image sensor.

2. The lens module of claim 1, wherein the at least one first mounting hole comprises a first connection portion and a second connection portion connected to the first connection portion, the first connection portion is attached to the casing, the second connection portion and the first connection portion form a preset angle therebetween, and the at least one first mounting hole is defined in the second connection portion.

3. The lens module of claim 1, wherein the voice coil motor further comprises a second connection plate connected to the casing, and the second connection plate defines at least one second mounting hole.

4. The lens module of claim 3, wherein the second connection plate comprises a third connection portion and a fourth connection portion connected to the third connection portion, the third connection portion is attached to the casing, the fourth connection portion and the third connection portion form a preset angle therebetween, and the at least one second mounting hole is defined in the fourth connection portion.

5. The lens module of claim 4, wherein the fourth connection portion comprises an edge facing away from the casing, and the at least one second mounting hole is defined at the edge.

6. The lens module of claim 3, wherein the second connection plate is integrally formed with the first connection plate.

7. The lens module of claim 3, wherein the casing comprises a first sidewall, a second sidewall, a third sidewall, and a fourth sidewall connected in that order, the first sidewall faces the third sidewall, the second sidewall faces the fourth sidewall, the first connection plate is connected to the first sidewall, and the second connection plate is connected to the third sidewall.

8. The lens module of claim 1, wherein the voice coil motor further comprises a lens received in the casing.

9. An electronic device comprising:
    a housing; and
    a lens module comprising a voice coil motor, the voice coil motor comprising a casing and a first connection plate connected to the casing, the first connection plate defining at least one first mounting hole, the lens module connected to the housing through the at least one first mounting hole;
    the lens module further comprising:
        a circuit board;

a mounting bracket mounted on a surface of the circuit board, wherein the casing is mounted on a surface of the mounting bracket, the mounting bracket defines an aperture passing through the mounting bracket, a surface of the mounting bracket facing the circuit board is recessed inwardly to form a receiving groove surrounding the aperture;

an optical filter received in the receiving groove; and an image sensor mounted on the surface of the circuit board having the mounting bracket, wherein the optical filter faces the image sensor.

10. The electronic device of claim 9, wherein the at least one first mounting hole comprises a first connection portion and a second connection portion connected to the first connection portion, the first connection portion is attached to the casing, the second connection portion and the first connection portion form a preset angle therebetween, and the at least one first mounting hole is defined in the second connection portion.

11. The electronic device of claim 9, wherein the voice coil motor further comprises a second connection plate connected to the casing, the second connection plate defines at least one second mounting hole, and the lens module further connected to the housing through the at least one second mounting hole.

12. The electronic device of claim 11, wherein the second connection plate comprises a third connection portion and a fourth connection portion connected to the third connection portion, the third connection portion is attached to the casing, the fourth connection portion and the third connection portion form a preset angle therebetween, and the at least one second mounting hole is defined in the fourth connection portion.

13. The electronic device of claim 12, wherein the fourth connection portion comprises an edge facing away from the casing, and the at least one second mounting hole is defined at the edge.

14. The electronic device of claim 11, wherein the second connection plate is integrally formed with the first connection plate.

15. The electronic device of claim 11, wherein the casing comprises a first sidewall, a second sidewall, a third sidewall, and a fourth sidewall connected in that order, the first sidewall faces the third sidewall, the second sidewall faces the fourth sidewall, the first connection plate is connected to the first sidewall, and the second connection plate is connected to the third sidewall.

16. The electronic device of claim 9, wherein the voice coil motor further comprises a lens received in the casing.

* * * * *